Figures 1, 2:
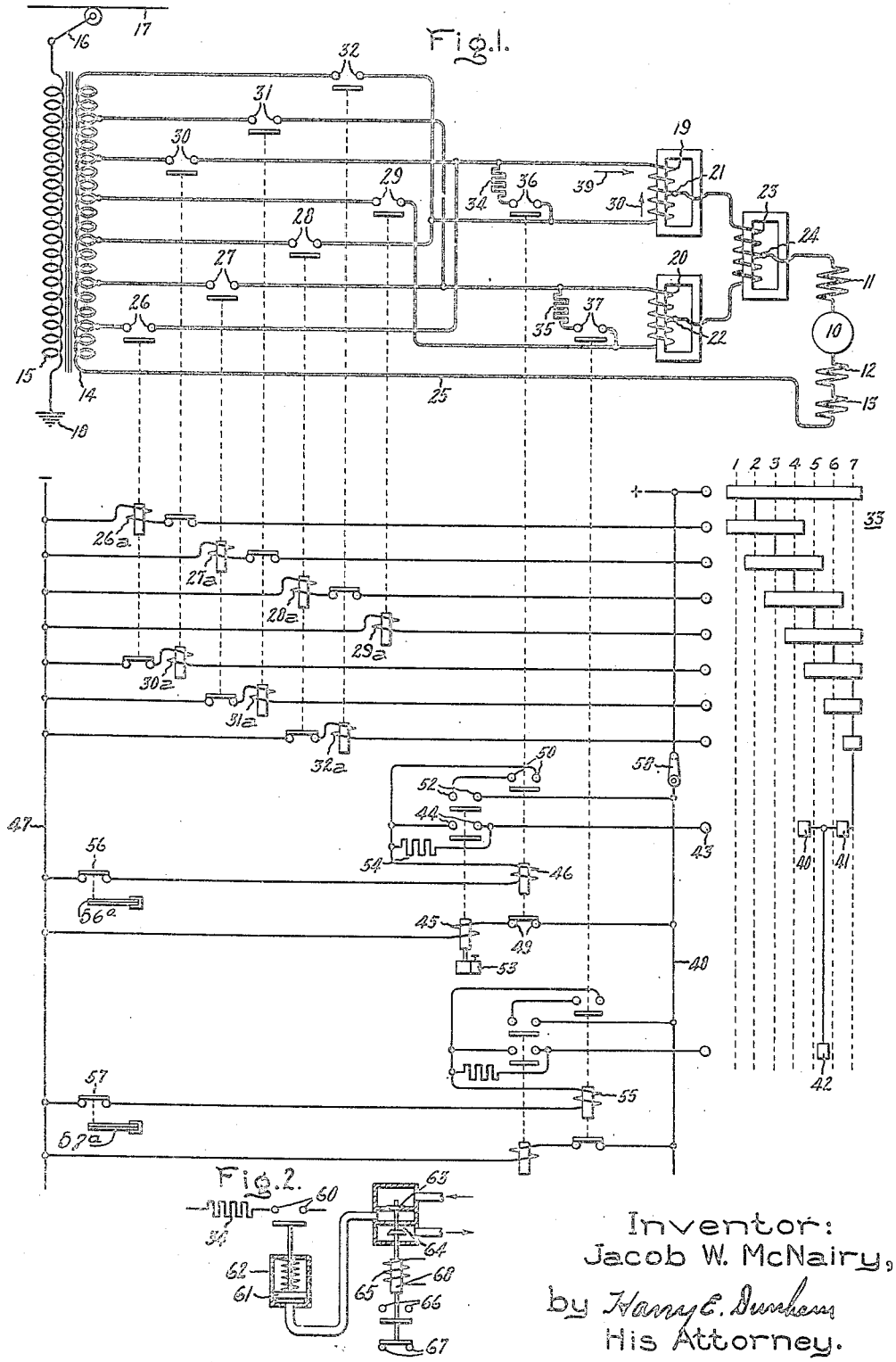

April 1, 1941.  J. W. McNAIRY  2,237,008

CONTROL SYSTEM

Filed Aug. 4, 1939

Inventor:
Jacob W. McNairy,
by Harry E. Dunham
His Attorney.

Patented Apr. 1, 1941

2,237,008

UNITED STATES PATENT OFFICE 2,237,008

CONTROL SYSTEM

Jacob W. McNairy, Erie, Pa., assignor to General Electric Company, a corporation of New York Application August 4, 1939, Serial No. 288,371

9 Claims. (Cl. 171—119)

My invention relates to control systems for electric motors, more particularly to systems for controlling the acceleration of single-phase alternating current railway motors of the type using preventive coils for obtaining various voltage steps, and has for its object a simple and reliable means for preventing momentary sag or decrease in the tractive effort of the motor while the tap connections are being changed.

In the operation of preventive coils for the provision of a multiplicity of voltage steps, the preventive coil introduces an appreciable reactive voltage drop in the motor circuit during a change in connections involving the disconnection of one terminal of the preventive coil from the supply source. As a result of this reactive voltage drop, the voltage and tractive effort of the motor are momentarily decreased. In accordance with my invention I provide a suitable resistor and control means for connecting this resistor momentarily across the preventive coil during the time that one terminal of the preventive coil is disconnected from the supply source whereby reactive voltage drop in the coil is prevented.

For a more complete understanding of my invention, reference should be had to the accompanying drawing, Fig. 1 of which is a diagrammatic representation of a railway motor control system embodying my invention, while Fig. 2 is a fragmentary view showing a modified form of my invention.

Referring to the drawing, I have shown my invention in one form as applied to the control of a single-phase alternating current series motor 10 provided with an exciting field winding 11, a compensating field winding 12 and an interpole field winding 13 arranged to be energized from a secondary winding 14 of a supply transformer having a primary winding 15. The primary winding 15 is connected to a suitable alternating current supply source, as shown, one terminal is connected to a trolley 16 bearing on a supply conductor 17 while its other terminal is connected to a ground 18.

The secondary winding 14 is provided with a multiplicity of voltage taps which are connected in sequence to the terminals of the two iron core preventive coils 19 and 20, midpoints or terminals 21 and 22 respectively of which are connected to the terminals of a third preventing coil 23. The midpoint 24 on this latter preventive coil is connected to one terminal of the motor circuit, the opposite terminal of which is connected through a conductor 25 to the lower terminal of the secondary winding 14.

The connections of the preventive coils are controlled by tap switches 26 to 32 inclusive which are operated by suitable coils 26a to 32a. These coils are in turn controlled by a manually-operated controller shown as a drum controller 33. This arrangement is substantially as described in U. S. Patent No. 2,064,637 to John F. Tritle, issued December 15, 1936. Movement of the controller 33 through its first four positions closes the switches 26 to 29 inclusive in succession. From the fourth to the fifth position the switch 26 is opened and the switch 30 is closed; from the fifth to the sixth positions 27 is opened and 31 is closed and from the sixth to the seventh position 28 is opened and 32 closed.

It will be observed that in going from each position to the next from the fourth position to the seventh, the preventive coil 19 or 20, as the case may be, is momentarily open circuited, i. e., one terminal only is connected to a tap on the secondary 14. This means that during that short interval, the entire motor current flows through one-half only of the preventive coil to its central tap 21 or 22 as the case may be. Consequently, if no means is provided to prevent it, this half of the preventive coil introduces an appreciable reactive drop in the motor circuit, the iron core of the preventive coil being magnetically saturated, with reduced voltage available for the motor. The current wave may be distorted because of saturation of the preventive coil core and high instantaneous voltages may be impressed on the insulation of the coils.

For example, in a typical installation with 128 volts between transformer taps connected to the opposite ends of the preventive coil, the voltage of the middle tap 21 or 22 of the preventive coil is half-way between the voltage of the two secondary taps, there being a voltage drop across each half of the preventive coil of 64 volts. Under these conditions, it will be observed that the motor current in the preventive coil, which is in addition to its excitation current, is the same in each half of the preventive coil but flowing in opposite directions. In other words, the motor current flows from each end of the preventive coil toward the central tap or vice versa, these two currents being equal. The magnetic fluxes set up by the motor current in the two halves of the preventive coil, therefore, neutralize each other and consequently the reactive voltage drop is relatively small.

When one end of the preventive coil referred to above was disconnected from the transformer, however, the voltage drop across the remaining half in the motor circuit, which then acting as an iron core reactor is relatively large in comparison with the circuit voltage as for example 96 volts. This drop in motor voltage results in an undesirable sag or decrease in the tractive effort of the motor and is accompanied by high transient voltages and by high surge currents in the tap switches.

In accordance with my invention, I provide impedances, preferably resistors 34 and 35 which are connected by the closure of suitable switches 36 and 37 across the preventive coils 19 and 20 respectively. These connections are established during the interval in which one terminal only of the preventive coils is connected to a transformer tap. Preferably the resistor is connected across the preventive coil just before the tap switch is opened and remains closed until after the next tap switch is closed.

During the short interval that the resistor is connected across a preventive coil, the preventive coil acts as an autotransformer, the half of the winding included in the motor circuit being the primary and the higher terminal voltage of the preventive coil being applied to the resistor connected across it. Current flows in the preventive coil and resistor in a direction opposite its flow in the half of the coil connected in the motor circuit. Thus, with the switch 36 closed under the conditions assumed, if the arrow 38 represents the motor current through the lower half of the coil in the motor circuit, the switch 28 being closed and the switches 26 and 30 being open, the current in the resistor circuit is in the direction indicated by the arrow 39. The value of the resistance 34 and also 35 is such that the current through it is substantially equal to the current in the preventive coil half connected in the motor circuit. In other words, the preventive coil acting as an autotransformer forces the load current to divide in these proportions by developing the necessary voltage to force one-half the load current through the resistors. Consequently, the current in the motor circuit half of the preventive coil is offset or neutralized and the core connected with this half remains unsaturated. The voltage drop across this half of the preventive coil in the motor circuit remains substantially unchanged and, consequently, there is substantially no sag in the motor voltage.

In order to control the switches 36 and 37 automatically as the controller 33 is advanced, I provide special short segments 40, 41 and 42 respectively between the controller positions 4—5, 5—6 and 6—7. As the controller is advanced, the segment 40 engages its fixed contact 43 just before the coil 26a is deenergized and thereby closes the circuit through the switch 44, which is held closed by its coil 45, thence through the operating coil 46 of the switch 36 and the negative control supply line 47. The circuit of the coil 45, it will be observed, is from the plus supply wire 48 through the interlock switch 49, operated by the coil 46, which is closed, the coil 45 and then to the negative supply 47. The coil 46 picks up its armature and closes the switch 36 and also closes its interlock switch 50 and opens the interlock switch 49. The closure of the interlock switch 50 connects the coil 46 directly across the control buses 47 and 48 through the switch 52 held closed by the coil 45. These two interlock switches 44 and 52 actuated by the coil 45 remain closed after the deenergization of the coil 45 by the opening of the switch 49, by reason of a suitable timing device such as a dashpot 53, for a predetermined interval such as one-half second. During this time interval, the controller 33 presumably, if moved normally, is moved to the next position at which time the switches 44 and 52 open. The switch 52 opens the circuit of the coil 46 whereupon the switch 36 opens to disconnect the resistor 34. If as would be true normally, the controller is thrown at once to the fifth position, the segment 40 will have disengaged the contact 43 by the time the switch 44 opens.

The switch 44 is provided as a protective measure in the event the controller is left in a midposition for any reason. In that event, the segment 40 remains in engagement with the contact 43 and consequently when the switch 44 opens, it inserts a current limiting resistor 54 in the circuit with the coil 46. This is to prevent overheating of the coil 46 which, in order to assure the required strong operating force in the short interval of time during which the controller is moved from one position to the other, is designed for operation on a lower voltage than the control voltage provided between supply conductors 47 and 48. For example, the control voltage in a typical case was 32 volts from a storage battery and the coil 46 was designed for operation on 12 volts continuously.

The segment 42 operates similar switching means in the control of the operating coil 55 for the resistor switch 37 and it is believed the operation will be understood from the preceding description.

In a similar manner, the segment 41 closes the switch 36 in passing from the sixth to the seventh position although in this case the tap switch 28 is open and the tap switch 32 thereafter closed.

Another protective feature is the provision of temperature responsive control switches 56 and 57 in the circuits of the coils 46 and 55 respectively. These switches are normally closed but are opened by suitable temperature responsive means, as shown bimetallic thermostats 56a and 57a, which are mounted adjacent the resistors 34 and 35 respectively so as to be heated by the resistors. The thermostats operate to deenergize the coils 46 or 54 and disconnect the resistors in the event that the resistors are heated to an excessive temperature.

A cutout switch 58 is provided in the control supply main 48. This switch may be opened manually to disconnect the control means for the switches 36 and 37 if desired after which the motor may be operated without using the resistors.

In this system it is desirable to provide control means which operates sufficiently fast to connect the resistance 34 or 35 across the preventive coil when the controller 33 is moved very rapidly from one control position to the next. Under these circumstances the control circuit established by the controller 33 for energizing the coil 46 or 55 is closed through the controller for a very short interval of time only, possibly as short as .002 to .003 second. In order to meet this contingency, I have found it desirable to use the coils 45 and 55 as relay coils only which close the switch 50 during this short interval of time for continuance of the sequencing cycle. Preferably also I provide suitable high speed pneumatic operating means for the switches 36 and 37 which operating means are controlled by the coils 46 and 55.

Such pneumatic operating means is disclosed, for example, in U. S. Patent No. 1,974,306 to Gray, dated September 18, 1934, for Electromagnetically controlled circuit controller, and is indicated diagrammatically in Fig. 2 of the drawing. Referring to Fig. 2, the normally open switch or contactor 60 for controlling the resistor 34 is operated to the closed position by a piston 61 in an air cylinder 62, the supply of compressed air to which is controlled by a normally closed inlet valve 63 and a normally open exhaust valve 64. These valves are operated by a coil 65, having the connections shown in Fig. 1 for the coil 46, which also operates control switches 66 and 67 corresponding with the switches 50 and 49 of Fig. 1. Preferably the plunger 68 of the coil 65 has a lost motion connection (not shown) with the stem of the valves 63 and 64 to provide for a limited amount of movement (independent of the plunger) before it operates the stem of the valves 63 and 64, this independent movement being sufficient to close the switch 66 and open the switch 67. Thus the coil 65, even though only momentarily energized, closes the switch 66 which assures a continuation of the cycle.

While I have shown a particular embodiment of my invention, it will be understood, of course, that I do not wish to be limited thereto, since many modifications may be made and I, therefore contemplate by the appended claims to cover any such modifications as fall within the true spirit and scope of my invention.

What I claim as new and desire to secure by Letters Patent of the United States, is:

1. A control system comprising a supply transformer having a plurality of different voltage taps, a preventive coil, tap switching means for connecting the terminals of said preventive coil to a pair of said taps and for disconnecting one terminal of said preventive coil from one of said taps and connecting said terminal to another tap, an impedance, impedance switching means for connecting said impedance across said preventive coil, and means operated by said tap switching means for operating said impedance switching means to connect said impedance across said preventive coil before said tap switching means is operated to disconnect one terminal of said preventive coil from one of said taps and for operating said impedance switching means to disconnect said impedance after said tap switching means is operated to connect said terminal to another tap.

2. A control system comprising a supply transformer having a plurality of different voltage taps, a preventive coil, tap switching means for connecting the terminals of said preventive coil to a selected pair of said taps and for disconnecting one terminal of said preventive coil from one of said taps and connecting said terminal to a higher voltage tap, a resistor, resistor switching means for connecting said resistor across said preventive coil, and means operated by said tap switching means for operating said resistor switching means to connect said resistor across said preventive coil before said tap switching means is operated to disconnect one terminal of said preventive coil from one of said taps, and timing means for controlling the operation of said resistor switching means to disconnect said resistor after a predetermined time interval.

3. A control system comprising a supply transformer having a plurality of different voltage taps, a preventive coil, tap switching means for connecting the terminals of said preventive coil to a pair of said taps and for disconnecting one terminal of said preventive coil from one of said taps and connecting said terminal to another tap, a resistor, resistor switching means for connecting said resistor across said preventive coil, and means operated by said tap switching means for operating said resistor switching means to connect said resistor across said preventive coil before said tap switching means is operated to disconnect one terminal of said preventive coil from one of said taps and for operating said resistor switching means to disconnect said resistor after said tap switching means is operated to connect said terminal.

4. A control system comprising a supply transformer provided with taps having different voltages with respect to one terminal of said transformer, a preventive coil, tap switching means for connecting pairs of said taps to the terminals of said preventive coil, a resistor, resistor switching means for connecting said resistor across the terminals of said preventive coil, control means for operating said tap switching means to connect two of said taps to said preventive coil and disconnect one terminal of said preventive coil from one of said taps and connecting said terminal to another tap, said control means operating said resistor switching means to connect said resistor across said preventive coil during the interval that one terminal of said preventive coil is disconnected from a tap, said control means including a coil for operating said resistor switch to closed position, a control resistance, and timing means set in operation by the energization of said coil for connecting said control resistance in series with said coil a predetermined interval of time after said coil is energized.

5. A control system comprising a supply transformer provided with taps having different voltages with respect to one terminal of said transformer, a preventive coil provided with an iron core, tap switching means for connecting pairs of said taps to the terminals respectively of said preventive coil, a resistor, resistor switching means for connecting said resistor across said preventive coil, control means for operating said tap switching means to connect two of said taps to said preventive coil, close said resistor switching means, then open the lower voltage one of said tap switching means, close a higher voltage tap switching means, and finally open said resistor switch, said control means including a coil for operating said resistor switching means to closed postion, a control resistance, and timing means set in operation by the energization of said coil for connecting said control resistance in series with said coil a predetermined interval of time after said coil is energized.

6. A control system comprising a supply transformer having a plurality of different voltage steps, a preventive coil, tap switching means for connecting the terminals of said preventive coil to a pair of said taps, a manually operated controller for said tap switching means movable from one position to another to disconnect one terminal of said preventive coil from one of said taps and connect said terminal to another tap, an impedance, impedance switching means for connecting said impedance across said preventive coil, and means operated by said controller when moved to a position between said two positions for operating said impedance switching means to connect said impedance across said preventive coil and timing means set in operation by the operation of said impedance switching means for controlling the operation of said impedance switching means to disconnect said impedance after a predetermined time interval.

7. A control system comprising a supply transformer provided with taps having different voltages with respect to one terminal of said transformer, a preventive coil, tap switching means for connecting pairs of said taps to the terminals respectively of said preventive coil, a resistor, pneumatically operated resistor switching means for connecting said resistor across said preventive coil, a manually operated controller for said tap switching means movable from one position to another position to open the lower voltage one of said tap switching means and then close a higher voltage tap switching means, and control means operated by said controller when in a position between said two positions for closing said resistor switching means before said lower voltage tap switching means is opened and then opening said resistor switching means after said higher voltage tap switching means is closed.

8. A control system comprising a supply transformer provided with taps having different voltages with respect to one terminal of said transformer, a preventive coil provided with an iron core, tap switching means for connecting pairs of said taps to the terminals respectively of said preventive coil, a resistor, resistor switching means for connecting said resistor across said preventive coil, a manually operated controller for said tap switching means movable from one position to another position to open the lower voltage one of said tap switching means and then close a higher voltage tap switching means, control means operated by said controller when in a position between said two positions for closing said resistor switching means before said lower voltage tap switching means is opened and then opening said resistor switching means after said higher voltage tap switching means is closed, said control means including a coil for controlling said resistor switching means, an interlock switch operated by said coil for closing a holding circuit for said coil, and timing means set in operation by the energization of said coil for opening said holding circuit a predetermined interval of time after said coil is energized.

9. A control system comprising a supply transformer having a plurality of different voltage taps, a preventive coil provided with a central terminal, tap switching means for connecting the two ends of said preventive coil respectively to a pair of said taps and for disconnecting one end of said preventive coil from one of said taps and connecting said end to another tap, an impedance, switching means for connecting said impedance across the two ends of said preventive coil, and means operated by said tap switching means for operating said impedance switching means to connect said impedance across the ends of said preventive coil while one end of said preventive coil is disconnected from a tap, said impedance having a value such that the current in said impedance is substantially equal to the current in the portion of said preventive coil between said central terminal and the end remaining connected to a transformer tap.

JACOB W. McNAIRY.